United States Patent [19]
Jose et al.

[11] Patent Number: 5,919,588
[45] Date of Patent: Jul. 6, 1999

[54] CATHODE ADDITIVE FOR ALKALINE PRIMARY CELLS

[75] Inventors: Horst-Udo Jose, Ellwangen; Wolfgang Puin, Hüttlingen; Christoph Klaus, Ellwangen, all of Germany

[73] Assignee: Varta Batterie Aktiengesellschaft, Hannover, Germany

[21] Appl. No.: 08/839,650

[22] Filed: Apr. 15, 1997

[30] Foreign Application Priority Data

Apr. 20, 1996 [DE] Germany ............................ 196 15 845

[51] Int. Cl.⁶ ...................................................... H01M 4/26
[52] U.S. Cl. ........................ 429/224; 429/206; 429/218.1
[58] Field of Search .................................. 429/206, 224, 429/218

[56] References Cited

U.S. PATENT DOCUMENTS

| | | | |
|---|---|---|---|
| 5,108,852 | 4/1992 | Tomantschger et al. | 429/66 |
| 5,156,934 | 10/1992 | Kainthia et al. | 429/224 |
| 5,342,712 | 8/1994 | Mieczkowska et al. | 429/224 |
| 5,516,604 | 5/1996 | Mieczkowska et al. | 429/218 |
| 5,532,085 | 7/1996 | Davis et al. | 429/224 |
| 5,569,564 | 10/1996 | Swierbut et al. | 429/224 |
| 5,599,644 | 2/1997 | Swierbut et al. | 429/224 |
| 5,660,953 | 8/1997 | Bai et al. | 429/224 |

FOREIGN PATENT DOCUMENTS

| | | |
|---|---|---|
| DE 27 07229 | 8/1978 | Germany . |
| WO 97/13285 | 4/1997 | WIPO . |

*Primary Examiner*—M Nuzzolillo
*Assistant Examiner*—Carol Chaney
*Attorney, Agent, or Firm*—Weiser and Associates, P.C.

[57] ABSTRACT

The invention relates to alkaline primary cells comprising a zinc gel as the anode material, an aqueous alkaline electrolyte, a separator and a cathode material containing manganese dioxide, wherein the cathode material comprises 0.1–5% by weight of alkali metal titanates and/or alkaline earth metal titanates.

16 Claims, 1 Drawing Sheet

CATHODE ADDITIVE FOR ALKALINE PRIMARY CELLS

BACKGROUND OF THE INVENTION

1. Field of the Invention

The present invention relates to batteries, and, in particular, to alkaline primary cells comprising a zinc gel as the anode material, an aqueous alkaline electrolyte, a separator, and a cathode material containing manganese dioxide.

2. Description of the Related Art

The cathodes used in alkaline primary cells customarily comprise manganese dioxide, graphite, and a binder. Additionally, electrolyte, surfactants, and further additives may be present. The manganese dioxide is used, particularly in the form deposited electrochemically (EMD), as the active cathode material.

Synthetic graphite of high purity or alternatively expanded graphite, prepared from natural graphites, in the form of a powder having a typical particle size of, e.g., 10–50 $\mu$m in the case of synthetic graphites and a particle size of 1–20 $\mu$Mm in the case of expanded graphites, are added to the cathode material as electroconductive material. Graphite has the function, when uniformly dispersed within the cathode compression-molded electrode as a conductive skeletal first-order matrix, of ensuring the electric charge transfer within the cathode. Customarily, the graphite content is from 7 to 10% by weight when synthetic graphites are used. If expanded graphites are used, it is possible, employing special blending techniques, to reduce the graphite content to about 5% by weight, an improvement in the discharge characteristics of the cathode being achieved at the same time.

In many cases, the cathode is composed of cathode rings inserted into the cell jar. The mechanical strength required of these cathode compacts is brought about by a binder. Modern fabrication plants for alkaline primary cells run at very high speed. Thus it is possible, for example, to achieve a production rate of 1000 cells of size LR6 per minute. These so-called "high-speed lines" pose certain minimum requirements with respect to the mechanical strength of the cathode rings which are conveyed in feeder sections and holding plates.

A drawback of most binders is that they require a volume that is not available for active material. Furthermore, many binders are hydrophobic and impede electrolyte uptake of the cathode during the cell fabrication process. This has adverse effects on cell performance.

Typical binders are powdered plastics from the group of the polyethylenes (PE), polypropylenes (PP), polyethylene terephthalates (PET), polytetrafluoroethylene (PTFE), polyacrylates (PA), polybutadienes (PB), and block polymers or copolymers of the abovementioned compounds. The introduction of binders in the form of aqueous dispersions is also known (e.g., PTFE or PE dispersions), the added water likewise having some of the characteristics of a binder with respect to the cathode compact.

The cathode material further comprises additions of alkaline electrolytes, preferably aqueous potassium hydroxide in concentrations of from 10 to 55%. Binary electrolytes such as KOH/NaOH or KOH/LiOH and ternary electrolytes such as KOH/NaOH/LiOH can be used.

An electrolyte is meant to fill the pores of the cathode to achieve ion conductivity in the cathode. A number of positive characteristics are thus achieved. Thus, the use of binders can be entirely or partially dispensed with, since alkalis likewise have some of the characteristics of a binder with respect to the cathode compact. A suitable choice of the amount of electrolyte allows an optimum porosity of the cathode to be set, with the result that the diaphragm resistance of the cathode compact is minimized. A reduced diaphragm resistance in turn distinctly improves the performance of the complete cells. A cathode comprising, e.g., 6% by weight of a 50% strength KOH electrolyte improves discharge characteristics of the cells fabricated therewith, compared with a cathode containing much less or no electrolyte. Moreover, it is possible, by means of a high concentration of the electrolyte, to distinctly reduce post-storage contact resistance from the cell jar to the cathode ring.

The fabrication of a cathode with a high electrolyte content in the cathode material does, however, have drawbacks with respect to the process, compared with a dry cathode mix. The fabrication of the cathode compact customarily makes use of so-called carousel-type compression molds. These carousel-type compression molds as a rule are made of special steel alloys that are subject to significantly increased wear as the electrolyte content in the cathode formation increases.

The addition of surfactants to the cathode material improves electrolyte uptake of the cathode. The surfactant is customarily added in very low concentrations of, for example, 1–100 ppm, based on the cathode weight, and can be added to the cathode mix both homogeneously and applied to the graphite component in a preliminary step, to reduce the hydrophobic properties of the graphite.

Customary surface-active substances can be liquid or solid and may be of the nonionic, anionic, or cationic type. Thus, for example, aliphatic fluorine compounds, aromatic and aliphatic phosphonic acids, or polyethylene glycols are suitable.

A drawback of such surfactants is occasionally observed, however, in that these, owing to their high molecular mobility, reach the zinc electrode as the counter electrode and there, with certain discharge modes (e.g., pulsed discharge), cause the voltage level to be lowered.

Further additives used include, inter alia, titanium compounds.

U.S. Pat. No. 5,342,712 proposes anatase $TiO_2$ as an additive to the cathode. The addition of from 0.1 to 2% by weight of the titanium dioxide modification anatase to the cathode material of alkali primary cells is claimed to enable an increase in the period of use by 15% with higher currents (3.9 ohm discharge).

What still remains desirable, however, is a dry-component cathode, i.e., without added electrolyte or with less added electrolyte, which cathode nevertheless in the assembled cell has the advantages of a pasted cathode. Another objective is to extend the service life of carousel-type compression molds for cathode fabrication, which results in cost savings in the production process.

It is an object of the present invention to provide a solution for the abovementioned problems.

Further aspects and advantages of this invention will become apparent from the detailed description which follows.

SUMMARY OF THE INVENTION

The object is achieved according to the invention, in that the cathode material of alkaline primary cells comprises 0.1–5% by weight of alkali metal titanates and/or alkaline earth metals titanates.

Embodiments of the present invention are directed to alkaline primary cells that comprise a zinc gel as the anode material, an aqueous alkaline electrolyte, a separator, and a cathode material containing manganese dioxide, wherein the cathode material comprises 0.1–5% by weight of alkali metal titanates and/or alkaline earth metal titanates.

Alternative embodiments of the present invention are directed to processes for fabricating an alkaline primary cell comprising a zinc gel as the anode material, an aqueous alkaline electrolyte, a separator, and a cathode material containing manganese dioxide, wherein the cathode material comprises 0.1–5% by weight of alkali metal titanates and/or alkaline earth metal titanates, wherein the alkali metal titanates and/or alkaline earth metal titanates are added in the form of a powder to the cathode material having an electrolyte content of from 4 to 5% by weight.

BRIEF DESCRIPTION OF THE DRAWINGS

Other aspects, features, and advantages of the present invention will become more fully apparent from the following detailed description, the appended claims, and the accompanying drawing in which

DETAILED DESCRIPTION

Figure 1:
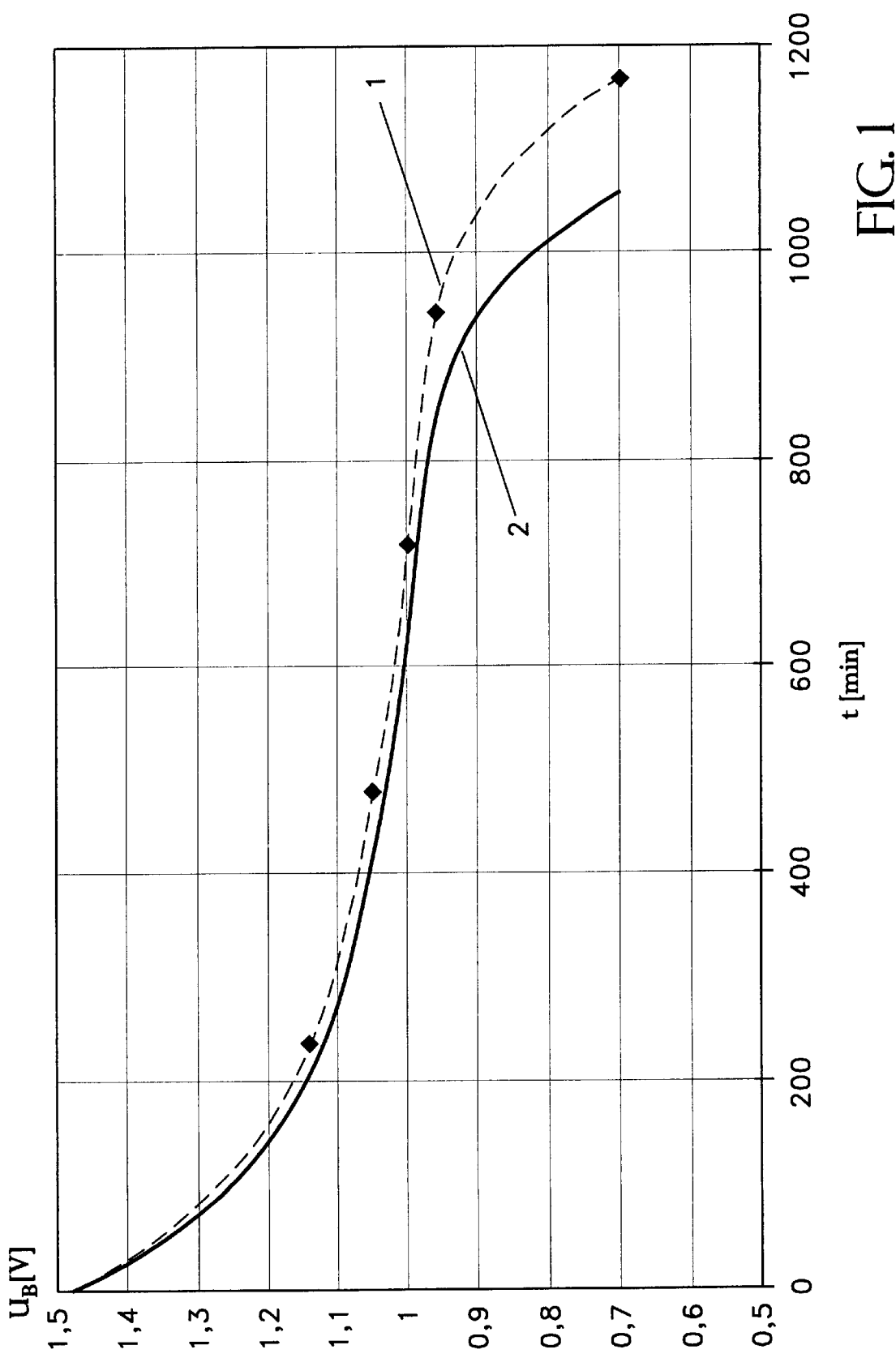
FIG. 1 shows the comparison of an LR20 containing $CaTiO_3$ (1) with a reference cell (2) with continuous discharge across a 2-ohm resistor.

The present invention is directed to alkaline primary cells in which the cathode material comprises 0.1–5% by weight of alkali metal titanates and/or alkaline earth metals titanates. Preferably, the cathode material of the alkaline primary cells comprises magnesium titanate ($MgTiO_3$) and/or calcium titanate ($CaTiO_3$) and/or lithium titanate ($Li_2TiO_3$). The addition of magnesium titanate ($MgTiO_3$) and/or calcium titanate ($CaTiO_3$) and/or lithium titanate ($Li_2TiO_3$) to the cathode material improves the discharge behavior of the battery and reduces gassing in the cell.

The process according to the invention for fabricating alkaline primary cells comprises the addition of the alkali metal titanates and/or alkaline earth metal titanates in the form of a powder to the cathode material having an electrolyte content of from 4 to 5% by weight.

Preferably, the alkali metal titanates and/or alkaline earth metal titanates added to the cathode material have a particle size of from 0.1 $\mu$m to 200 $\mu$m and a BET surface area of 0.5–500 $m^2/g$.

The alkali metal titanates and/or alkaline earth metal titanates are preferably added to the cathode material in a purity of more than 95%.

The present invention is described with reference to the following examples. Cathode mixes comprising the components 86.0% of EMD, 9.0% of graphite, and 4.5% of electrolyte (50% strength KOH) are admixed with 0.2% by weight, 0.5% by weight, or 2% by weight, respectively, of the following titanium compounds: magnesium titanate ($MgTiO_3$), calcium titanate ($CaTiO_3$), or lithium titanate ($Li_2TiO_3$). For comparative purposes, a cell (reference cell) without added titanates and a cell containing 0.5% by weight of anatase $TiO_2$ in the cathode material are fabricated.

The mixes are granulated and then densified to produce annular compacts. These are pushed into the cell jar, after which the separator was inserted, either in the form of a honeycomb or in the form of a convolute separator. Then, the gel-type zinc electrodes are metered in. The zinc anode comprises 68% by weight of a zinc powder having a particle size distribution of, typically, 50–500 $\mu$m particle size and about 32% by weight of an alkaline electrolyte (e.g., a 40% strength KOH). This anode is additionally admixed with small amounts of a gassing inhibitor (e.g., $In_2O_3$ or $In(OH)_3$), a gelling agent (e.g., Carbopol 940), a surface-active substance (e.g., glycol, polyethylene glycol, or a fluoro surfactant).

Table 1 shows the results of the experiments with various titanium compounds in terms of performance and gassing. This demonstrates that using $MgTiO_3$, $CaTiO_3$, or $Li_2TiO_3$, as well as improving the continuous and intermittent discharge characteristics, also reduces gassing of the cell.

FIG. 1 shows the comparison of an LR20 containing $CaTiO_3$ (1) with a reference cell (2) with continuous discharge across a 2-ohm resistor. At switch-off voltages below 0.95 V, significant run-time advantages can be observed.

It will be further understood that various changes in the details, materials, and arrangements of the parts which have been described and illustrated in order to explain the nature of this invention may be made by those skilled in the art without departing from the principle and scope of the invention as expressed in the following claims.

TABLE 1

| Type LR 6 | Titanium compound | 3.9 ohms cont. Ah → 0.75 V | Pulse cycles → 0.9 V 15 s/m, 7 d/w - 1.8 ohms | Flash cycles → 1 V 15 s/m, 1 h/d, 7 d/w - 2 ohms | Gassing without initial discharge (ml) 7d at 70° C. | Gassing with initial discharge (ml) 7d at 70° C. |
|---|---|---|---|---|---|---|
| Mignon | 0.5% $MgTiO_3$ | 1.81 | 604 | 505 | 0.3 | 0.3 |
|  | 0.5% $Li_2TiO_3$ | 1.80 | 555 | 495 | 0.3 | 0.3 |
|  | 0.5% $TiO_2$ anatase | 1.78 | 519 | 393 | 0.4 | 0.4 |
|  | 0.2% $MgTiO_3$ | 1.84 | 578 | 485 | 0.3 | 0.3 |
|  | Reference | 1.731 | 525 | 471 | 0.4 | 0.4 |

| Type LR 20 | Titanium compound | 2 ohms cont. Ah → 0.9 V | Gassing without initial discharge (ml) 7d at 70° C. | Gassing with initial discharge (ml) 7d at 70° C. |
|---|---|---|---|---|
| Mono | 0.5% $CaTiO_3$ | 9.2 | 3.3 | 5.5 |
|  | 0.5% $Li_2TiO_3$ | 9.4 | 3.7 | 6.3 |
|  | 0.5% $TiO_2$ anatase | 8.8 | 3.8 | 6.3 |

TABLE 1-continued

| 2% MgTiO$_3$ | 9.1 | 3.9 | 5.8 |
| 2% CaTiO$_3$ | 9.1 | 2.9 | 6 |
| Reference | 8.6 | 3.9 | 7.7 |

What is claimed is:

1. Alkaline primary cell comprising a zinc gel as an anode material, an aqueous alkaline electrolyte, a separator, and a cathode material comprising manganese dioxide and 0.1–5% by weight of an additive having an alkali metal titanate, wherein the alkali metal titanate is lithium titanate.

2. The invention of claim 1, wherein at least 95% by weight of the additive is lithium titanate.

3. The invention of claim 2, wherein:
   the cathode material comprises a powder of the lithium titanate and an electrolyte content of from 4 to 5% by weight; and
   the lithium titanate has a particle size of from 0.1 µm to 200 µm and a BET surface area of 0.5–500 m$^2$/g.

4. The invention of claim 1, wherein the cathode material comprises a powder of the alkali metal titanate and an electrolyte content of from 4 to 5% by weight.

5. The invention of claim 1, wherein the alkali metal titanate has a particle size of from 0.1 µm to 200 µm and a BET surface area of 0.5–500 m$^2$/g.

6. The invention of claim 1, wherein the additive further comprises an alkaline earth metal titanate.

7. The invention of claim 6, wherein the alkaline earth metal titanate comprises one of the group consisting of calcium titanate, magnesium titanate, and mixtures thereof.

8. A process for fabricating an alkaline primary cell comprising a zinc gel as an anode material, an aqueous alkaline electrolyte, a separator, and a cathode material comprising manganese dioxide and 0.1–5% by weight of an additive having an alkali metal titanate, the process comprising the steps of:
   (a) adding the alkali metal titanate to the cathode material; and
   (b) fabricating the alkaline primary cell using the cathode material containing the alkali metal titanate, wherein the alkali metal titanate is lithium titanate.

9. The invention of claim 8, wherein at least 95% by weight of the additive is lithium titanate.

10. The invention of claim 9, wherein:
    the cathode material comprises a powder of the lithium titanate and an electrolyte content of from 4 to 5% by weight; and
    the lithium titanate has a particle size of from 0.1 µm to 200 µm and a BET surface area of 0.5–500 m$^2$/g.

11. The invention of claim 8, wherein the cathode material comprises a powder of the alkali metal titanate and an electrolyte content of from 4 to 5% by weight.

12. The invention of claim 8, wherein the alkali metal titanate has a particle size of from 0.1 µm to 200 µm and a BET surface area of 0.5–500 m$^2$/g.

13. The invention of claim 8, wherein the additive further comprises an alkaline earth metal titanate.

14. The invention of claim 13, wherein the alkaline earth metal titanate comprises one of the group consisting of calcium titanate, magnesium titanate, and mixtures thereof.

15. The invention of claim 8, wherein:
    step (a) comprises the step of mixing the alkali metal titanate with the manganese dioxide, graphite, and electrolyte to form the cathode material; and
    step (b) comprises the steps of:
    (1) granulating and densifying the cathode material to produce an annular compact;
    (2) inserting the annular compact into a cell jar;
    (3) inserting the separator into the cell jar; and
    (4) metering in the zinc gel.

16. The invention of claim 15, wherein the zinc gel comprises zinc powder, an alkaline electrolyte, a gassing inhibitor, a gelling agent, and a surface-active substance.

* * * * *